(12) United States Patent  (10) Patent No.: US 6,662,004 B1
Thomas  (45) Date of Patent: Dec. 9, 2003

(54) RADIOTELEPHONE

(75) Inventor: Graham Thomas, Surrey (GB)

(73) Assignee: Nokia Mobile Phones Limited, Espoo (FI)

( * ) Notice: Subject to any disclaimer, the term of this patent is extended or adjusted under 35 U.S.C. 154(b) by 405 days.

(21) Appl. No.: 09/721,618

(22) Filed: Nov. 27, 2000

(30) Foreign Application Priority Data

Nov. 26, 1999 (GB) .............................................. 9928083

(51) Int. Cl.$^7$ .............................................. H04M 11/10
(52) U.S. Cl. .......................... 455/412; 455/41; 455/419
(58) Field of Search ........................ 455/41, 412, 418, 455/419, 420, 558, 41.2, 41.3; 365/51, 63; 710/102, 129; 711/102, 103

(56) References Cited

U.S. PATENT DOCUMENTS 6,018,775 A * 1/2000 Vossler .......................... 710/1
6,405,278 B1 * 6/2002 Liepe .......................... 711/103
6,452,826 B1 * 9/2002 Kim et al. ..................... 365/51

FOREIGN PATENT DOCUMENTS

| GB | 2283151 | 4/1995 |
| GB | 2336966 | 3/1999 |
| JP | 1169305 | 3/1999 |
| WO | 9411967 | 5/1994 |

* cited by examiner

*Primary Examiner*—Lee Nguyen
(74) *Attorney, Agent, or Firm*—Antonelli, Terry, Stout & Kraus, LLP

(57) ABSTRACT

A portable radio communication device having low power radio frequency unit, and having associated therewith a plurality of memory packs, the memory packs being situated remote from and external of the portable radio communication device, and the memory packs having a low power radio frequency unit associated respectively therewith, the portable radio communication device including data transfer means whereby the portable radio communication device is operable to read from and write to selectable ones of the memory packs, the data transfer means providing for the read/write data operations by low power radio frequency transfer between the low power radio frequency unit of the memory packs and the low power radio frequency unit of the portable radio communication device. One advantage of this invention is that bulky memory is not situated in the mobile phone handset itself, which is thus more compact.

6 Claims, 1 Drawing Sheet

RADIOTELEPHONE

BACKGROUND OF THE INVENTION

The present invention relates to a portable radio communication device such as a mobile phone, and in particular to arrangements for the storage of data therefor.

Mobile phones are becoming ever more advanced offering a growing range of sophisticated features and functionalities. For instance, as well as standard voice communications, mobile phones increasingly also allow for data communications such as SMS, and browser type applications. In Communicator type devices, mobile phones are being equipped with personal organiser software providing diaries, notes and address recording functions. Furthermore, videophones are now beginning to emerge.

In order to support these new and growing features, mobile phones are demanding more and more data storage capacity, i.e. memory space. Although developments in memory make up and design now allow for far more increased memory storage density and capacity than was previously possible, the advances in feature development outpaces memory development, with the net result being that in physical terms feature-rich mobile phones are required to be larger in size in order to accommodate the extra memory space necessary for supporting the additional functionalities. This dimensional expansion of mobile phones however is in direct conflict with the general trend in mobile phones design towards their miniaturisation.

SUMMARY OF THE INVENTION

Accordingly, and in one aspect the present invention provides a system comprising a portable radio communication device and a plurality of memory modules situated remote from and external of the portable radio communication device,
- said portable radio communication device and each of the memory modules respectively including low power radio frequency means for respective low power radio frequency connections therebetween,
- the portable radio communication device including data transfer means for at least one of read access or write access in respect of one or more of the memory modules,
- said data transfer means being coupled to said respective low power radio frequency means and effecting said at least one of read or write accesses by respective low power radio frequency connections between the low power radio frequency means of the portable radio communication device and the low power radio frequency means of the memory modules.

By means of the invention, a portable radio communication device can store data on, and retrieve data from, any of a number of memory modules which are located away from the device itself and which are accessed by means of low power radio frequency links. Accordingly, the size and design of the portable radio communication device is not fettered by the requirement for 'on-board' data storage means, thereby increasing the design freedom for the device and overall leading to a more compact device. Furthermore, the low power radio frequency link between the portable radio communication device and the memory module means that there needs to be no physical links (such as troublesome wires) between the two, thus making for a very convenient arrangement.

BRIEF DESCRIPTION OF THE DRAWING

The present invention will now be described by way of example with reference to the accompanying drawing which is a schematic representation of a preferred embodiment of the present invention.

DETAILED DESCRIPTION OF THE INVENTION

Figure 1:
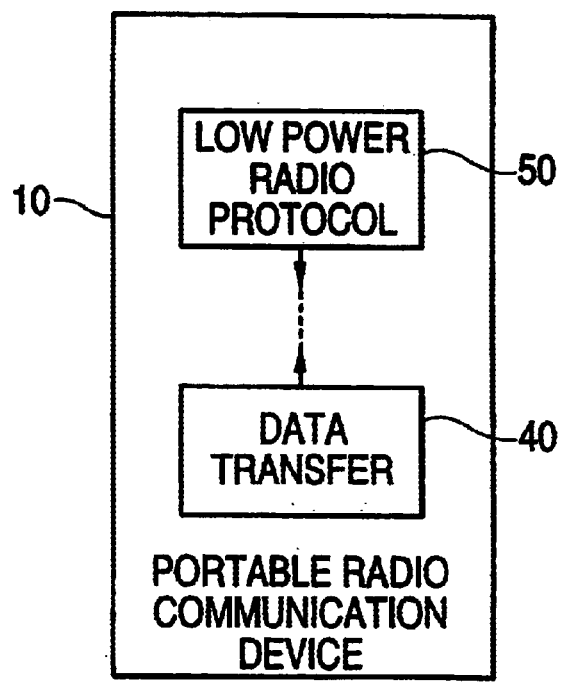
Figure 1:
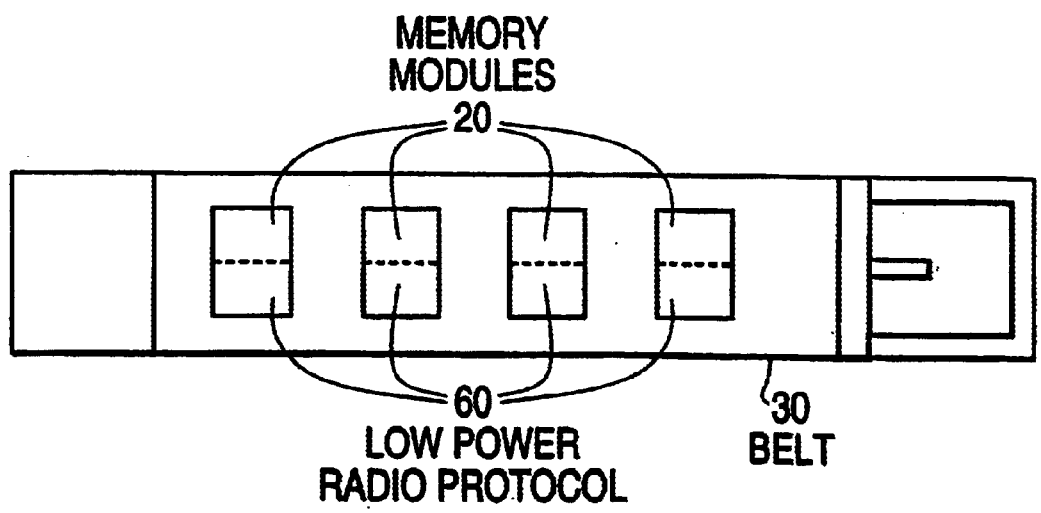

Referring to the drawing, there is shown a portable radio communication device 10 such as a mobile phone which is capable of cellular communication with a network. The mobile phone is provided with the standard features necessary for two-way cellular communication (voice, data, internet) with a network. The drawing also schematically shows a series of memory modules 20, which in accordance with a preferred embodiment of the invention are mounted on a harness in the form of a memory belt 30. The belt 30 carrying memory modules 20 is designed to be worn by a user. Each of the memory modules provided on the memory belt has a non-volatile memory storage capacity, and data can be written to and read from such memory.

The mobile phone includes a data transfer means 40, under the control of a processor in the phone, and this is used to carry out point-to-point transmissions relating to read and write operations between the mobile phone and each of the memory modules. In a read operation, the mobile phone directs that data which is located in a selected memory module be transferred from that memory module to the mobile phone. Conversely, in a write operation, the mobile phone directs that data be transferred from the phone to one or more selected memory modules for storage therein. The flow of data between the mobile phone and a memory module is not by means of wires between the two, but instead by means of low power radio frequency links between the two.

For this purpose, both the mobile phone and each of the memory modules are equipped with low power radio frequency means. In the mobile phone, the low radio frequency means is denoted at 50 and in the memory modules the low power radio frequency means is denoted at 60. The data transfer means 40 and low power radio frequency means are inter-connected. Suitably, the low power radio frequency means may be that as defined in the Bluetooth protocol, and in this regard, the mobile phone contains a Bluetooth microcontrol module, memory and power source.

Accordingly, in a read operation, the data transfer means 40 order transmission of request signals to the memory module via the low power radio frequency means 50 of the mobile phone. These request signals are transmitted in a lower power radio frequency transmission. The request signals are received by the memory module 20, where the signals are decoded and then used to control location and retrieval of the required data. Once the requested data has been located in the memory module 20 this data is coded for transmission and subsequently transmitted to the mobile phone 10 by the lower power radio frequency means 60 of the memory module 20 in a low power radio frequency signal. This low power radio frequency signal is received by the low power radio frequency means of the mobile phone where it is decoded and the required data extracted therefrom and subsequently loaded for example in the RAM of the mobile phone for further use.

In a write operation, a broadly reverse series of steps occurs. Specifically, in this mode, the data transfer means 40 controls the transfer of data to be written to the memory module. That data may initially be stored in RAM, and so the data transfer means commands the movement of that data from RAM to the low power radio frequency means 50 of the mobile phone 10. Here the data is coded and transmitted as a low power radio frequency signal to the selected memory module. At the memory module 20, this signal is received by the low power radio frequency means 60 thereof, and the data extracted from the signal. Accordingly, the data is loaded into the memory module for storage therein.

The present invention may be embodied in other specific forms without departing from its essential attributes. For example, it is envisaged that data may be transferred from a fixed point data kiosk to the memory modules for read/write access. In an alternative to each of the memory modules having its own low power radio frequency means, there could be just one low power radio frequency means servicing each of the plurality of memory modules.

Accordingly reference should be made to the appended claims and other general statement's herein rather than to the foregoing specific description as indicating the scope of invention.

In a write operation, broadly a reverse series of steps occurs. Specifically, in this mode, the data transfer means 40 controls the transfer of data to be written to the memory module. That data may initially be stored in RAM, and so the data transfer means commands the movement of that data from RAM to the low power radio frequency means 50 of the mobile phone 10. Here the data is coded and transmitted as a low power radio frequency signal to the selected memory module. At the memory module 20, this signal is received by the low power radio frequency means 60 thereof, and the data extracted from the signal. Accordingly, the data is loaded into the memory module for storage therein.

The appended abstract as filed herewith is included in the specification by reference.

What is claimed is:

1. A system comprising a portable radio communication device and a plurality of memory modules situated remote from and external of the portable radio communication device, said portable radio communication device and the memory modules respectively including low power radio frequency means for respective low power radio frequency connections therebetween, the portable radio communication device including data transfer means for at least one of read access or write access in respect to one or more of the memory modules, said data transfer means being coupled to said respective low power radio frequency means and causing said at least one of read or write accesses by controlling said respective low power radio frequency connections between the low power radio frequency means of the portable radio communication device and the low power radio frequency means of the memory modules; and wherein said data transfer means causes data transfer between a selected one of the plurality of memory modules and a selected other one of the memory modules by a low power radio frequency connection between respective low power radio frequency means of said memory modules.

2. A system according to claim 1, wherein said data transfer means is user controllable for selectively controlling data transfer between the portable radio communication device and the memory modules, and between individual memory modules.

3. A portable radio communication device having a low power radio frequency unit and being adapted for use with a system as defined in claim 2.

4. A memory module having a low power radio frequency unit and being adapted for use with a system as defined in claim 2.

5. A portable radio communication device having a low power radio frequency unit and being adapted for use with a system as defined in claim 1.

6. A memory module having a low power radio frequency unit and being adapted for use with a system as defined in claim 1.

* * * * *